(12) United States Patent
Germain et al.

(10) Patent No.: US 9,866,954 B2
(45) Date of Patent: Jan. 9, 2018

(54) PERFORMANCE METRIC BASED STOPPING CRITERIA FOR ITERATIVE ALGORITHMS

(71) Applicant: Adobe Systems Incorporated, San Jose, CA (US)

(72) Inventors: Francois G. Germain, Stanford, CA (US); Gautham J. Mysore, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 485 days.

(21) Appl. No.: 14/325,208

(22) Filed: Jul. 7, 2014

(65) Prior Publication Data
US 2016/0007130 A1    Jan. 7, 2016

(51) Int. Cl.
| | |
|---|---|
| H04R 3/00 | (2006.01) |
| G06F 17/16 | (2006.01) |
| G10L 17/00 | (2013.01) |
| G10L 21/0208 | (2013.01) |
| G10L 21/0272 | (2013.01) |

(52) U.S. Cl.
CPC .............. *H04R 3/00* (2013.01); *G06F 17/16* (2013.01); *G10L 17/00* (2013.01); *G10L 21/0208* (2013.01); *G10L 21/0272* (2013.01)

(58) Field of Classification Search
CPC ..................................................... H04R 29/00
USPC ................ 381/58; 704/235; 290/44; 706/12; 716/51
See application file for complete search history.

(56) References Cited

U.S. PATENT DOCUMENTS

| | | | | |
|---|---|---|---|---|
| 8,667,430 | B1* | 3/2014 | Latypov .................... | G03F 1/70 716/51 |
| 8,933,572 | B1* | 1/2015 | Abdur-Rahim ........... | H02P 9/00 290/44 |
| 2001/0056344 | A1* | 12/2001 | Ramaswamy .......... | G10L 15/22 704/235 |
| 2011/0119210 | A1* | 5/2011 | Zhang .................. | G06N 99/005 706/12 |

OTHER PUBLICATIONS

Duan, et al., "Online PLCA for Real-time Semi-supervised Source Separation", Latent Variable Analysis and Signal Separation, 2012., 2012, 8 pages.

(Continued)

*Primary Examiner* — Md S Elahee
(74) *Attorney, Agent, or Firm* — Wolfe-SBMC

(57) ABSTRACT

Performance metric based stopping criteria for iterative algorithm techniques are described. In one or more implementations, a training dataset is processed by one or more computing devices using an iterative algorithm having a cost function. The processing includes, for a plurality of iterations of the iterative algorithm, computing a cost for the iterative algorithm using the cost function and a value for each of a plurality of performance metrics that are usable to infer accuracy of the iterative algorithm for a respective one of the iterations. Responsive to the processing, a particular one of the plurality of iterations is identified as a stopping criterion based at least in part on the computed values for the plurality of performance metrics and the stopping criterion is output to configure the iterative algorithm to use the stopping criterion for subsequent processing of data by the iterative algorithm.

20 Claims, 11 Drawing Sheets

(56) References Cited

OTHER PUBLICATIONS

Emiya, et al., "Subjective and objective quality assessment of audio source separation", IEEE Transactions on Audio, Speech, and Language Processing, vol. 19, No. 7,, 2011, 12 pages.
Fevotte, et al., "Algorithms for nonnegative matrix factorization with the B-divergence", Neural Computation, vol. 23, No. 9, 2011., Mar. 7, 2011, 24 pages.
Fevotte, et al., "Non-negative dynamical system with application to speech and audio", In Proceedings of the 2013 IEEE International Conference on Acoustics, Speech and Signal Processing, May 2013, 7 pages.
Fevotte, et al., "Nonnegative Matrix Factorization with the Itakura-Saito Divergence: With Application to Music Analysis", Neural Computation 21, 793-830 (2009), Jul. 3, 2008, pp. 793-830.
Fitzgerald, et al., "On the Use of Masking Filters in Sound Source Separation", in Proceedings of the 15th International Conference on Digital Audio Effects. 2012, Dublin Institute of Technology., Sep. 2012, 7 pages.
Garofolo, et al., "DARPA TIMIT—Acoustic-phonetic Continuous Speech Corpus CD-ROM", National Institute of Standards and Technology, NISTIR 4930, Feb. 1993, 94 pages.
King, et al., "Optimal Cost Function and Magnitude Power for NMF-based Speech Separation and Music Interpolation", in Proceedings of the 2012 IEEE International Workshop on Machine Learning for Signal Processing, Sep. 2012, 6 pages.
Lee, et al., "Algorithms for Non-negative Matrix Factorization", in NIPS 13, 2001, 2001, 7 pages.
Mohammadiha, et al., "Prediction Based Filtering and Smoothing to Exploit Temporal Dependencies in NMF", in ICASSP, 2013., 2013, 5 pages.
Mysore, et al., "Non-Negative Hidden Markov Modeling of Audio with Application to Source Separation", International Conference on Latent Variable Analysis and Signal Separation (LVA/ ICA), Sep. 2010, 8 pages.
Smaragdis, "Supervised and Semi-Supervised Separation of Sounds from Single-Channel Mixtures", ICA'07 Proceedings of the 7th international conference on Independent component analysis and signal separation, 2007, 8 pages.
Smaragdis, et al., "Non-Negative Matrix Factorization for Polyphonic Music Transcription", IEEE Workshop on Applications of Signal Processing to Audio and Acoustics, Oct. 19, 2003, pp. 177-180.
Sun, et al., "Universal Speech Models for Speaker Independent Single Channel Source Separation", in ICASSP, 2013., 2013, 8 pages.
Vincent, et al., "Performance Measurement in Blind Audio Source Separation", IEEE TASLP, 14(4), Jul. 2006, 9 pages.
Virtanen, "Monaural sound source separation by nonnegative matrix factorization with temporal continuity and sparseness criteria", Audio, Speech, and Language Processing, IEEE Transactions on, vol. 15, No. 3, 2007., Mar. 2007, pp. 1066-1074.

\* cited by examiner

|  | $K_S$ | $K_N$ | Optimal | $\frac{dD}{D}$ | $\log\left(\frac{dD}{D}\right)$ | Iter. | log-Iter. | Max. aver. |
|---|---|---|---|---|---|---|---|---|
| SDR | 20 | 5 | 9.64 | 9.33 | 9.63 | 9.63 | 9.63 | 9.63 |
|  | 20 | 150 | 6.47 | 5.51 | 6.05 | 5.94 | 6.05 | 6.14 |
|  | 5 | 50 | 7.05 | 6.29 | 6.61 | 6.52 | 6.62 | 6.67 |
|  | 30 | 50 | 9.32 | 8.86 | 9.26 | 9.26 | 9.26 | 9.26 |
| OPS | 20 | 5 | 42.73 | 23.14 | 41.42 | 41.49 | 41.49 | 41.41 |
|  | 20 | 150 | 44.38 | 39.68 | 41.79 | 33.6 | 41.88 | 42.06 |
|  | 5 | 50 | 43.47 | 41.11 | 41.37 | 32.81 | 41.44 | 41.58 |
|  | 30 | 50 | 39.75 | 20.88 | 39.07 | 39.14 | 39.06 | 39.14 |
| SDR | 20 | 5 | 7.57 | 6.94 | 6.83 | 6.76 | 6.92 | 7.09 |
|  | 20 | 150 | 9.26 | 8.89 | 8.69 | 8.85 | 8.96 | 8.98 |
|  | 5 | 50 | 7.4 | 6.16 | 5.95 | 6.97 | 7.13 | 7.23 |
|  | 30 | 50 | 7.36 | 6.7 | 6.58 | 5.42 | 6.66 | 6.75 |
| OPS | 20 | 5 | 27.8 | 19.88 | 25.72 | 25.9 | 25.69 | 25.82 |
|  | 20 | 150 | 43.64 | 40.61 | 41.18 | 38.76 | 40.97 | 41.33 |
|  | 5 | 50 | 43.14 | 39.53 | 40.46 | 25.08 | 41.05 | 40.89 |
|  | 30 | 50 | 36.88 | 12.22 | 33.9 | 34.57 | 33.92 | 34.57 |

| $K_S \backslash K_N$ | | 5 | 10 | 20 | 30 | 50 | 70 | 100 | 150 | 200 |
|---|---|---|---|---|---|---|---|---|---|---|
| 5 | Best | 8.7 | 8.8 | 8.5 | 8.2 | 7.7 | 7.3 | 6.8 | 6.2 | 5.8 |
| | No. | 10 | 10 | 10 | 7 | 7 | 7 | 7 | 7 | 7 |
| | *Fixed* | *5.9* | *3.7* | *2.1* | *1.3* | *0.6* | *0.3* | *0.0* | *-0.2* | *-0.2* |
| 10 | Best | 8.5 | 8.9 | 9.1 | 9.2 | 9.2 | 9.1 | 9.0 | 8.8 | 8.5 |
| | No. | 30 | 15 | 10 | 10 | 10 | 10 | 10 | 10 | 10 |
| | *Fixed* | *7.7* | *6.2* | *4.6* | *3.8* | *2.8* | *2.3* | *1.9* | *1.6* | *1.5* |
| 20 | Best | 8.1 | 8.3 | 8.6 | 8.8 | 9.1 | 9.2 | 9.3 | 9.4 | 9.4 |
| | No. | 100 | 30 | 20 | 20 | 15 | 15 | 15 | 10 | 10 |
| | *Fixed* | *8.1* | *7.7* | *6.7* | *6.0* | *5.1* | *4.6* | *4.1* | *3.7* | *3.5* |
| 30 | Best | 7.7 | 7.9 | 8.2 | 8.4 | 8.7 | 8.8 | 9.0 | 9.2 | 9.3 |
| | No. | 200 | 50 | 30 | 30 | 20 | 20 | 15 | 15 | 15 |
| | *Fixed* | *7.7* | *7.8* | *7.4* | *7.0* | *6.3* | *5.8* | *5.4* | *4.9* | *4.7* |
| 50 | Best | 7.1 | 7.4 | 7.6 | 7.7 | 8.0 | 8.2 | 8.4 | 8.6 | 8.8 |
| | No. | 500 | 200 | 70 | 50 | 30 | 30 | 30 | 20 | 20 |
| | *Fixed* | *6.8* | *7.3* | *7.5* | *7.5* | *7.2* | *7.0* | *6.7* | *6.4* | *6.2* |

*Fig. 8*

PERFORMANCE METRIC BASED STOPPING CRITERIA FOR ITERATIVE ALGORITHMS

BACKGROUND

Iterative algorithms may employ cost functions to support a variety of functionality. The cost function, for instance, may be utilized to perform sound processing, image processing, and so on. For example, a cost of an iterative algorithm may be optimized to perform sound decomposition for audio data, such as to perform sound removal, source separation, and so forth.

Conventional techniques that were utilized to employ these iterative algorithms typically employed a predefined number of iterations that were predefined by a user, e.g., one hundred iterations. The predefined number was often set by a user based on an assumption of "more is better" and thus relied on a perceived balance between accuracy (e.g., obtained through a higher number of iterations) and computing device resource consumption, e.g., an amount of time used by the computing device to perform the iterations.

However, a cost computed by the cost function may not have a monotonic relationship to a desired result, and thus the "more is better" assumption may be in error and thus result in performance of additional iterations that may introduce error into a desired result and may also result in needless consumption of computing device resources.

SUMMARY

Performance metric based stopping criteria for iterative algorithm techniques are described. In one or more implementations, a training dataset is processed by one or more computing devices using an iterative algorithm having a cost function. The processing includes, for a plurality of iterations of the iterative algorithm, computing a cost for the iterative algorithm using the cost function and a value for each of a plurality of performance metrics that are usable to infer accuracy of the iterative algorithm for a respective one of the iterations. Responsive to the processing, a stopping criterion is identified based at least in part on the computed values for the plurality of performance metrics and the stopping criterion is output to configure the iterative algorithm to use the stopping criterion for subsequent processing of data by the iterative algorithm.

In one or more implementations, sound data is received by one or more computing devices. The sound data is processed by the one or more computing devices using an iterative algorithm having a cost function using a number of iterations defined at least in part by one or more stopping criteria. The one or more stopping criteria are computed from a training dataset based on values computed for each of a plurality of performance metrics that are usable to infer accuracy of the iterative algorithm for a respective one of the iterations.

In one or more implementations, a system includes one or more modules implemented at least partially in hardware. The one or more modules are configured to perform operations that include processing a training dataset using an iterative algorithm having a cost function. The processing includes, for a plurality of iterations of the iterative algorithm, computing a cost for the iterative algorithm using the cost function and a value for each of a plurality of performance metrics that are usable to infer accuracy of the iterative algorithm for a respective one of the iterations. Responsive to the processing, a stopping criterion is identified based at least in part on the computed values for the plurality of performance metrics and the stopping criterion is output to configure the iterative algorithm to use the stopping criterion for subsequent processing of data by the iterative algorithm.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 7 is a table showing a comparison of performance metrics at an iteration number that yields a highest SDR and OPS scores and iteration numbers obtained from five heuristics for a supervised (top) and semi-supervised (bottom) algorithms with four different sets of model sizes.

FIG. 8 is a table showing examples of SDR scores recorded at the iteration number for a maximum average score heuristic and a corresponding iteration number compared to an SDR score when using a fixed number of one hundred iterations with forty-five different sets of model sizes.

DETAILED DESCRIPTION

Overview

As previously described, implementation of conventional iterative algorithms typically involves use of a pre-defined number of iterations. This number is generally based on an assumption that an increased number of iterations may have increased accuracy due to convergence of a cost of the algorithm. However, this may not be the case in actual implementation as the cost function may not be directly related to a desired outcome.

For example, non-negative matrix factorization (NMF) may be utilized to support a variety of different sound processing and analysis techniques, e.g., for sound decomposition, source separation, noise removal, speaker identification, and so on. NMF based algorithms iteratively optimize a cost. A correlation between costs and application-dependent performance metrics may not be monotonical, however, e.g., optimization of the cost past a certain number of iterations may not result in an improvement of a desired outcome. Accordingly, use of a predefined number of iterations that are based on a "more is better" approach may in actuality result in a less accurate output.

Accordingly, iterative algorithm stopping criteria techniques are described. Continuing with the previous example, the case of supervised and semi-supervised NMF based source separation is described in the following where it is shown that iterating these algorithms to convergence is not optimal in each instance of use of the algorithm. Accordingly, several heuristic stopping criteria are identified and described that have been found, empirically, to be well correlated with source separation performance.

A variety of techniques may be employed to learn appropriate stopping criteria. For example, by integrating the learning of an appropriate stopping criterion in a parameter sweep, substantial performance improvements may be obtained with minimal additional computing device resource consumption. Further, computation of the stopping criteria may be performed using a training set and then used for subsequent processing of other data and thus a user of the stopping criteria is not exposed to a cost in calculation of the criteria. Further discussion of these and other techniques may be found in relation to the following sections.

In the following discussion, an example environment is first described that may employ the techniques described herein for sound processing. Although sound processing is described, these techniques may be performed for a variety of other iterative algorithms, e.g., in which a cost being optimized does not have a monotonical relationship with a performance metric for an operation being supported by the cost function. Example procedures are then described which may be performed in the example environment as well as other environments. Consequently, performance of the example procedures is not limited to the example environment and the example environment is not limited to performance of the example procedures.

Example Environment

Figure 1:
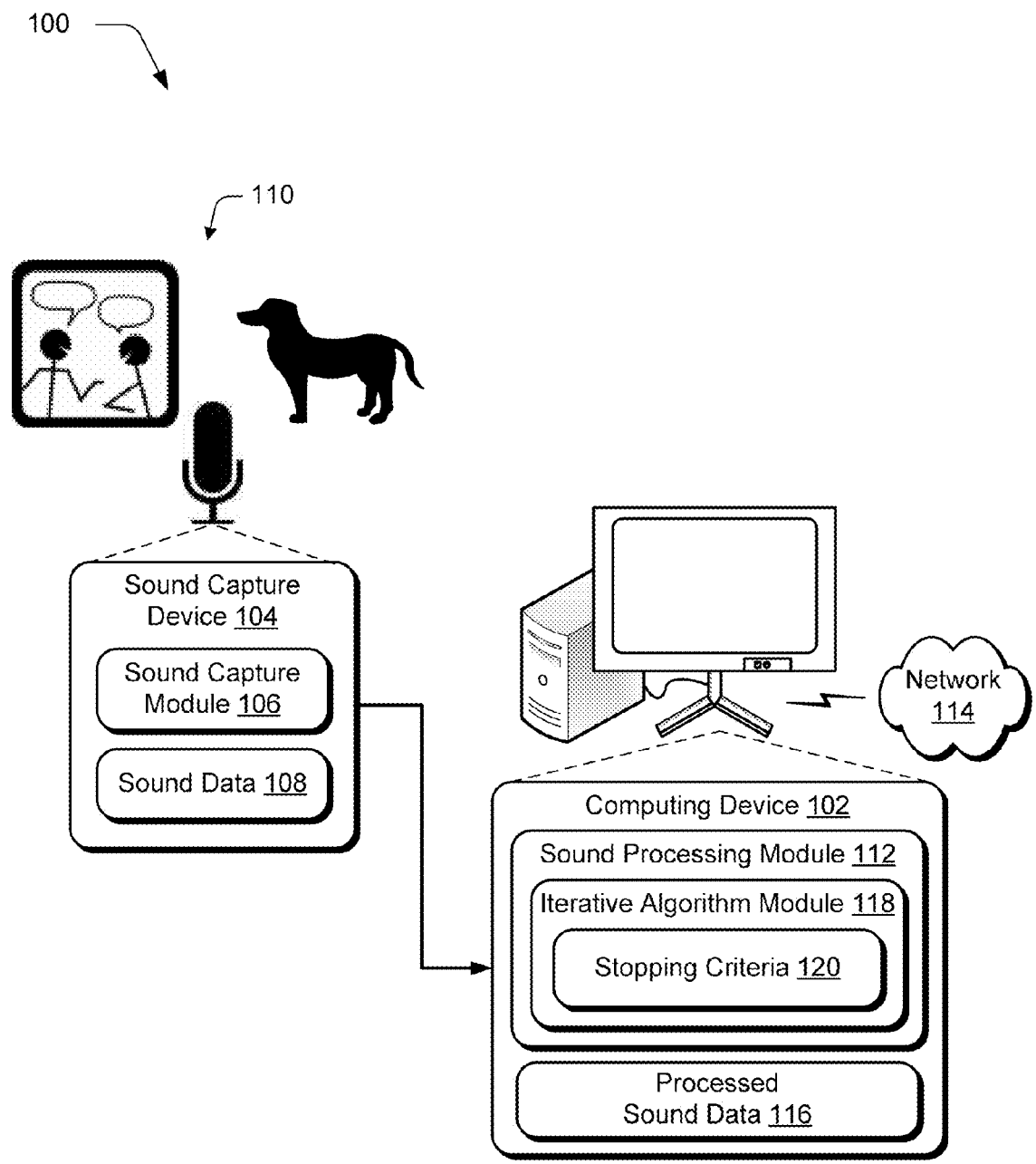
FIG. 1 is an illustration of an environment in an example implementation that is operable to employ stopping criteria techniques as described herein.

FIG. 1 is an illustration of an environment 100 in an example implementation that is operable to employ iterative algorithm stopping criteria techniques described herein. The illustrated environment 100 includes a computing device 102 and sound capture device 104, which may be configured in a variety of ways. Again, although sound processing techniques are described as an example of an iterative algorithm a variety of other techniques are also contemplated as further described below.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 11.

The sound capture device 104 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture device 104 is illustrated separately from the computing device 102, the sound capture device 104 may be configured as part of the computing device 102, the sound capture device 104 may be representative of a plurality of sound capture devices, and so on.

The sound capture device 104 is illustrated as including a respective sound capture module 106 that is representative of functionality to generate sound data 108. The sound capture device 104, for instance, may generate the sound data 108 as a recording of an audio scene 110 having one or more sources. This sound data 108 may then be obtained by the computing device 102 for processing.

The computing device 102 is illustrated as including a sound processing module 112. The sound processing module is representative of functionality to process the sound data 108 to form processed sound data 114. Although illustrated as part of the computing device 102, functionality represented by the sound processing module 112 may be further divided, such as to be performed "over the cloud" via a network 114 connection, further discussion of which may be found in relation to FIG. 11.

A wide variety of different types of sound processing may be performed by the sound processing module 112, such as sound decomposition, source separation, speaker identification, noise removal, and so on. For example, the sound data 108 may be decomposed according to a likely source of the data. As illustrated in the audio scene 110 of FIG. 1, for instance, the sound processing module 112 may process the sound data 108 to separate sound data of two users talking from the barking of a dog to form the processed sound data 116 that is separated according to a respective source. This may be used to support a variety of different functionality, such as audio denoising, music transcription, music remixing, audio-based forensics, enhanced speech recognition, and so on.

The sound processing module 112 may employ an iterative algorithm as part of the processing of the sound data 108, implementation of which is represented by an iterative algorithm module 118 in the environment 100. A variety of different iterative algorithms may be implemented by the module. Continuing with the previous example, the iterative algorithm module 118 may be configured to implement non-negative matrix factorization (NMF) as part of sound processing.

From the original formulation of NMF and its application to sound data, multiple variants of the algorithm have been proposed to improve performance in different scenarios. Variants include the use of cost functions other than the original Euclidean distance and generalized Kullback-Leibler (KL) divergence, such as the Itakura-Saito divergence and the more general Beta divergence. Other developments include the use of temporal modeling and various types of sparsity constraints.

Accuracy of the sound processing techniques may be inferred using a variety of different performance metrics. Source separation techniques, for instance, may be evaluated using the BSS evaluation metrics which include three values, e.g., "scores." The scores include a Source-to-Distortion Ratio (SDR), a Source-to-Interference Ratio (SIR) and a Source-to-Artifact Ratio (SAR), which respectively measure the overall quality of the separation, the attenuation of the interfering sources, and the degradation of the target signal due to artifacts. Other performance metrics include metrics based on a nonlinear mapping of signal-related quantities to the results of perceptual experiments, which are referred to as PEASS metrics, in order to address concerns in the mismatch between perceptual quality and the BSS evaluation scores. The PEASS metric that is used to measure the overall quality of the separation is Overall Perceptual Score (OPS). For speech separation, metrics such as the Short-Time Objective Intelligibility Measure (STOI) that measure speech intelligibility degradation can be valuable as well.

While the number of NMF-based techniques are growing, questions remain on how to choose the best technique for a given task along with how to choose how long that task is to be performed, e.g., a stopping criterion. These questions are further challenged in that performance metrics may be unrelated to a cost that is being optimized for the iterative algorithm. Accordingly, although consecutive iterations of the algorithm monotonically improve the performance with respect to the cost, there is no guarantee that the consecutive iterations improve the performance with respect to a performance metric of interest and thus accuracy of the iterative algorithm for its intended purpose.

Accordingly, techniques are described in which one or more stopping criteria 120 are identified by the computing device 102. The iterative algorithm module 118, for instance, may be configured to identify stopping criteria (e.g., a number of iterations that are to be performed for the algorithm) from a training dataset, e.g., of sound data. The stopping criteria 120 may then be used for processing of subsequent data as further described below.

In the following, a correlation between a cost of NMF based supervised and semi-supervised source separation is examined in relation to performance metrics that include BSS, PEASS and STOI evaluation scores. Several heuristic stopping criteria 120 are proposed to alleviate the mismatch between those quantities. In the first section that follows, an example of an iterative algorithm is described. In the following section, results are described of empirical convergence analysis of these algorithms and the associated performance metrics. A section then following in which stopping criteria 120 are proposed and the results of examples of validation experiments are described.

Example Iterative Algorithm

NMF is an example of an iterative algorithm that may be utilized to support a variety of functionality through implementation by a computing device 102. For example, NMF-based source separation algorithms take advantage of the non-negative nature of the signal magnitude spectrogram "X=|$\mathcal{X}$|" with $\mathcal{X}$ the signal short-time Fourier transform (STFT) to approximate it as "X≈WH" through the optimization problem:

$$\operatorname{argmin}_{W,H} D(X \| WH) \tag{1}$$

where "D" represents the cost function, subject to the constraint that "W" and "H" are non-negative matrices. The columns of "W" can typically be interpreted as the spectral basis vectors of the sources in the spectrogram. The matrix "H" can then be interpreted as the activity of each vector in a given time frame of the spectrogram. Here, the generalized KL divergence is used as a cost function as it is commonly used in source separation. It is defined as:

$$D(X \| \hat{X}) = \sum_{i,j} X_{i,j} \log\left(\frac{X_{i,j}}{\hat{X}_{i,j}}\right) - X_{i,j} + \hat{X}_{i,j} \tag{2}$$

where "$\hat{X}=WH$."

Figure 2:
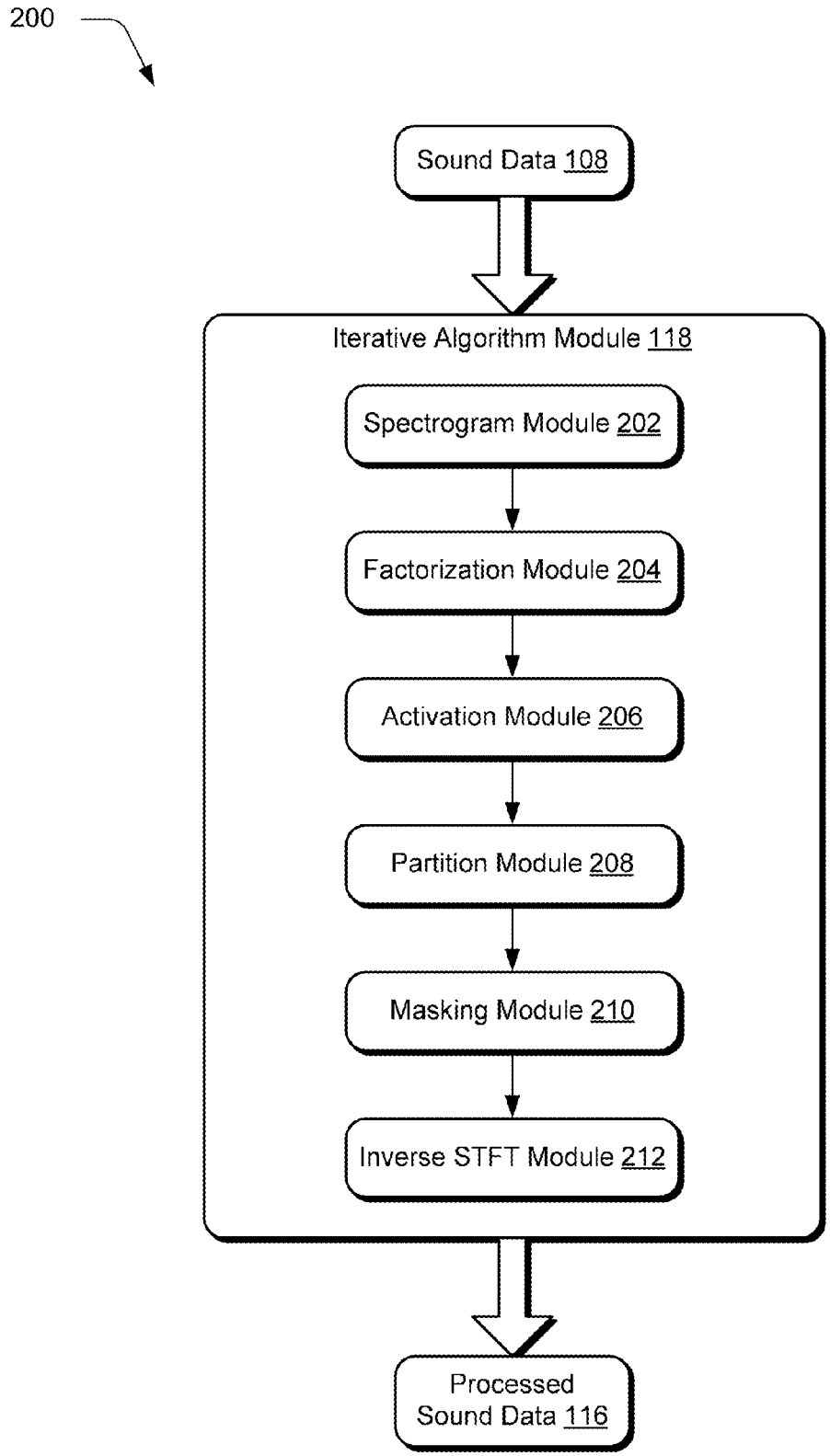
FIG. 2 depicts a system in an example implementation showing a pipeline of an iterative algorithm module of FIG. 1 usable to implement nonnegative matrix factorization.

FIG. 2 depicts a system 200 in an example implementation showing a pipeline of the iterative algorithm module 118 of FIG. 1 usable to implement nonnegative matrix factorization. The iterative algorithm module 118 includes a pipeline formed using a spectrogram module 202, factorization module 204, activation module 206, partition modules 208, masking module 210, and inverse short-time Fourier transform (STFT) module 212 that is configured to process sound data 108 to form processed sound data 116. This may be performed to support a variety of functionality, such as source separation, noise removal, and so on.

For example, the spectrogram module 202 may be utilized to compute spectrograms "$X_S$" and "$X_N$" from speech and noise training dataset, as well as the spectrogram "X" of a test mixture signal. A factorization module 204 is then employed to factorize the spectrograms "$X_i \approx W_i H_i$," for "i=S,N" using NMF and form the matrix "W=[$W_S$ $W_N$]." The factorization module 204 factorizes clean training data for each source and then learns features "$W_i$". The factorization module 204 is thus also representative of functionality to perform feature learning. The activation module 206 may then be used to learn the activations "H" from the mixture spectrogram while keeping "W" fixed, "X≈WH." Thus, the activation module 206 is also representative to perform activation learning by analyzing mixture spectrograms either during training or testing in order to learn the activations matrix "H".

A partition module 208 may then partition the activations in two blocks as:

$$H = \begin{bmatrix} H_S \\ H_N \end{bmatrix}$$

and construct estimated spectrograms:

$$\hat{X}_i = W_i H_i$$

The masking module 210 is then used to construct two time-frequency masks from the "$\hat{X}_i$" and extracts estimated STFTs of each source through Wiener filtering of the mixture STFT "$\mathcal{X}$":

$$\hat{\mathcal{X}}_S = \frac{\hat{X}_S}{\hat{X}_S + \hat{X}_N} \mathcal{X} \text{ and } \hat{\mathcal{X}}_N = \frac{\hat{X}_N}{\hat{X}_S + \hat{X}_N} \mathcal{X} \tag{3}$$

An inverse STFT module 212 is then utilized to compute an inverse STFT of "$\hat{x}_i$," to get an estimate of each source signal. In one or more implementations, the mixture STFT is computed in both the spectrogram module (the spectrogram values are the magnitude of the mixture STFT values) and here in the masking values (to be filtered through Wiener filtering). Accordingly, a STFT module may be incorporated on "top" of the chain of described modules that would feed both the spectrogram module 202 and the masking module 210 with the STFT of the input sound data.

This pipeline corresponds to a supervised separation, where training data is available for both sources. In the case in which training data is available for a single one of the sources (for example speech, as is often the case for speech denoising), semi-supervised separation may be performed, by modifying the pipeline such that only "$W_S$" is learned by the factorization module 204, while "$W_N$" and "H" are learned simultaneously from the mixture spectrogram by the activation module 206.

Empirical Convergence Analysis

For the purpose of analyzing the convergence properties of both supervised and semi-supervised NMF based source separation, the case of speech denoising is examined in this example. For speech denoising, a mixture of speech with background noise is received, to which a source separation iterative algorithm is applied by the iterative algorithm module 118. The iterative algorithm module 118 may be configured to give a particular focus to 1) a clean reconstruction of the speech, and 2) a significant reduction of the noise level. In both cases, a speech training dataset is available, while noise training data is available in the supervised case, solely. To evaluate the results, the following discussion focuses on the metrics relative to the separated speech signal.

Magnitude spectrograms in this example are computed using a 1024-sample Hann window with 75% overlap. For both supervised and semi-supervised algorithms, speaker and noise dependent models $W_S$ and $W_N$ are trained form the training data with the following number of vectors, ($K_S$ for speech, $K_N$ for noise): ($K_S$;$K_N$)={(20; 5); (20; 150); (5; 50); (50; 30)}. Models of individual sources were trained (from isolated training data) until the cost $D_n$ (at iteration n) verifies the following:

$$|D_{n+1}-D_n|<10^{-4}|D_n|$$

The scores are computed along a logarithmic grid of iteration numbers accounting for the fact that the variations of the studied quantities become smaller as a large number of iterations are reached.

For speech data, utterances from 600 speakers are recorded at a sampling rate of 16 kHz. The utterances for a given speaker are divided into training and testing segments. For noise data, samples are used from two datasets, for a total of thirty different noise types. The first dataset contains examples of quasi-stationary noises, e.g., factory, helicopter, jet aircraft. The second dataset contains examples of non-stationary noises, e.g., frogs, keyboard, ringtones. The data for a given noise type is also divided between a training and a testing segments, the training data is not utilized in the case of semi-supervised separation. A test utterance of each speaker is mixed with a single type of noise for a total of 600 mixtures (20 mixtures per noise type). Each mixture is 5-seconds long, and is associated with at least 17.5 seconds of training data for both speech and noise.

In setting stopping criteria for an iterative optimization algorithm, a cost may be used at iteration "n" as a measurable quantity in practical scenarios. A threshold "$\epsilon \geq 0$" may also be set on the relative variation of the cost instead of the absolute variation for the criterion to become scale-independent as in "$|D_{n+1}-D_n|<\epsilon|D_n|$". This corresponds to a discretization of a threshold on the value of the cost function log-derivative $$\text{"}\frac{1}{D}\frac{dD}{dn}\text{"}$$

with respect to the number of algorithm iterations "n," for conciseness, the absolute value is omitted here.

Figure 3:
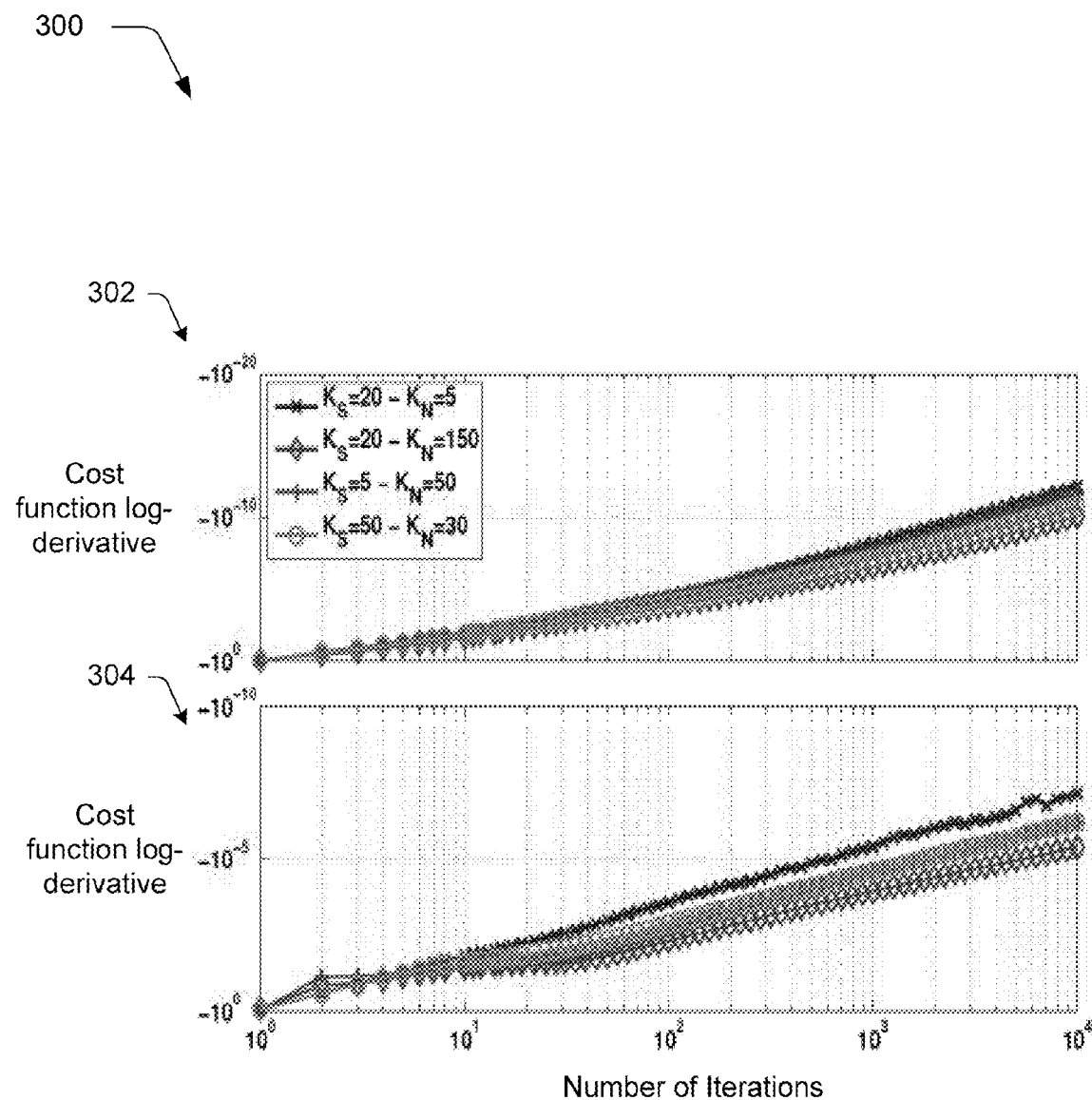
FIG. 3 depicts an example implementation showing average of cost function log-derivative scores for supervised and semi-supervised noise removal with four different sets of model sizes.

FIG. 3 depicts an example implementation 300 showing cost function log-derivative values for supervised 302 and semi-supervised 304 noise removal with four different sets of model sizes. The results show that this quantity is roughly a linear function of the number of iterations in the log-log domain for both the supervised and the semi-supervised algorithms. The results also show that the log-derivative value at a given iteration is mostly independent of the algorithm parameters.

Figure 4:
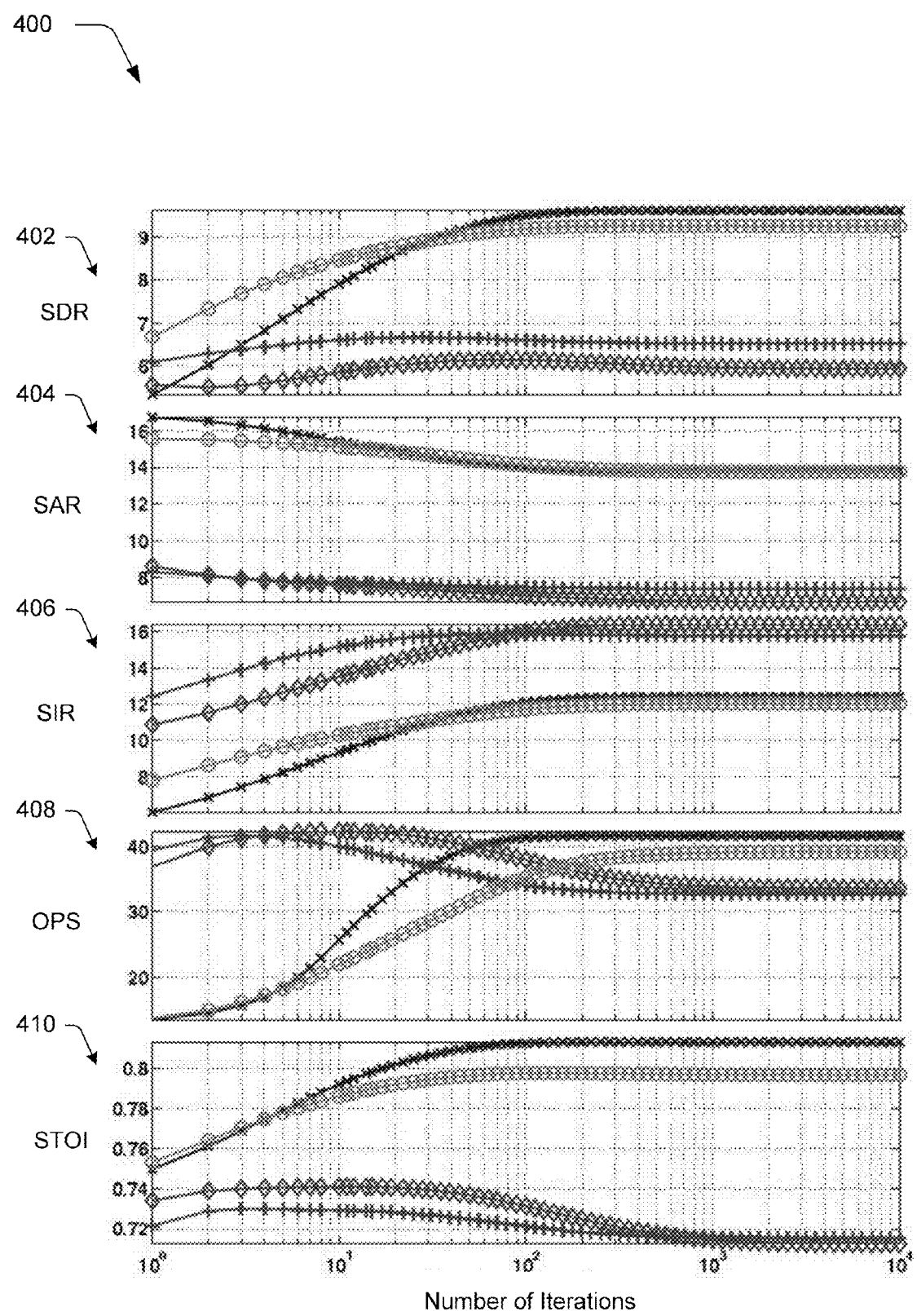
FIG. 4 depicts an example implementation showing average scores of five performance metrics for a supervised algorithm with four different sets of model sizes.
Figure 5:
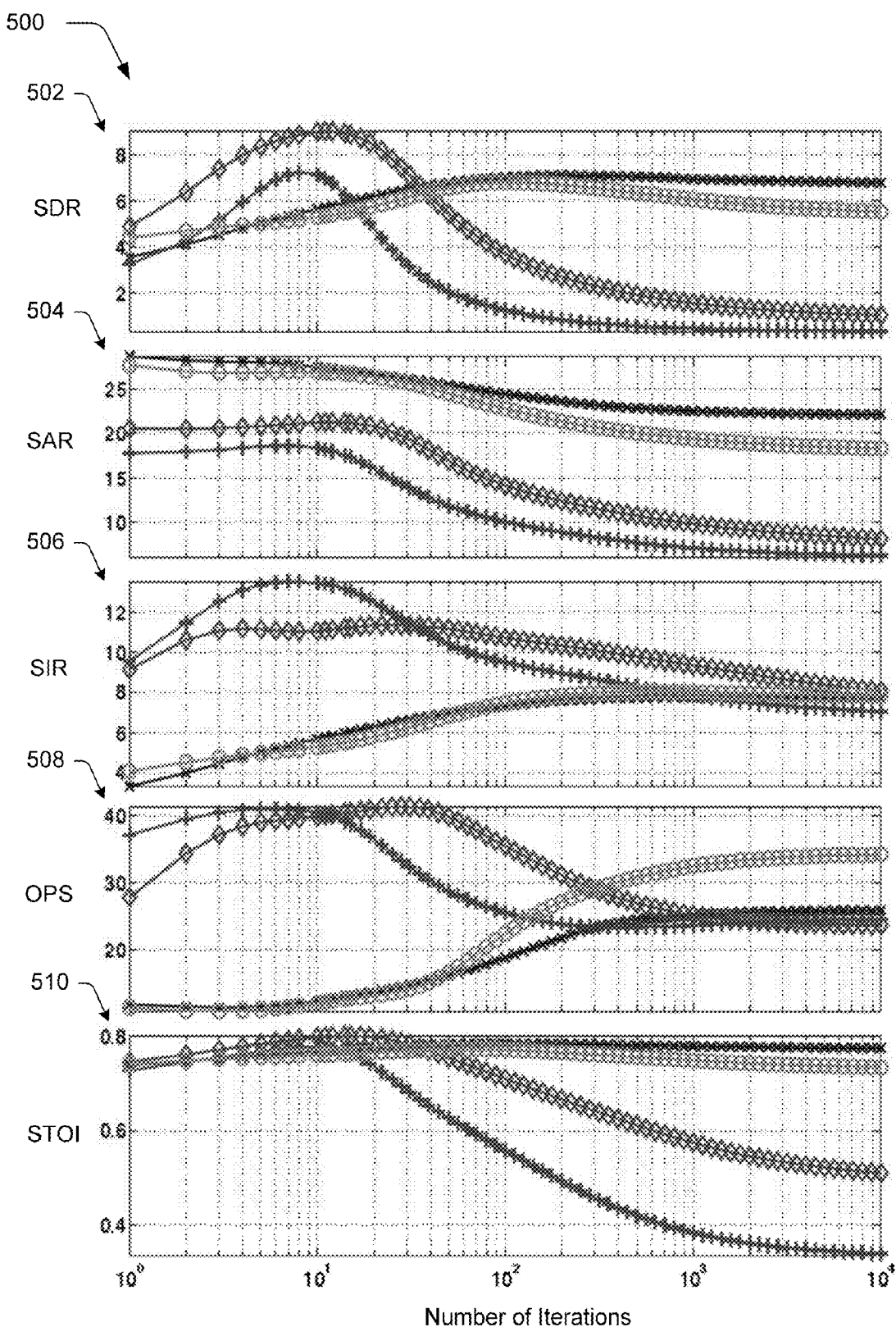
FIG. 5 depicts an example implementation showing average scores of five performance metrics for a semi-supervised algorithm with four different sets of model sizes.

FIG. 4 depicts an example implementation 400 showing average SDR 402, SAR 404, SIR 406, OPS 408, and STOI 410 scores for the supervised algorithm. FIG. 5 depicts an example implementation 500 showing average SDR 502, SAR 504, SIR 506, OPS 508, and STOI 510 scores for the semi-supervised algorithm. While the variation of the average cost function log derivative value is roughly monotonic, this does not match the behavior of the overall scores in the source separation metrics. For the supervised algorithm, the average SDR, OPS and STOI scores reach their maximum before slowly decreasing at each additional iteration, but the degradation of the score is limited as shown in FIG. 4. Except for the OPS score of ($K_S$;$K_N$)=(50; 30), a similar observation may be made for the semi-supervised algorithm. However, the scores now decrease more significantly for each additional iteration beyond the maximum as shown in FIG. 5.

The SAR appears to be monotonically decreasing for both algorithms after a few iterations, but that degradation is faster for the semi-supervised algorithm. The SIR appears to increase monotonically and then in most cases degrades after reaching a maximum value, similar to the SDR. This is more pronounced in the semi-supervised algorithm. This suggests that the noise model starts learning parts of the speech patterns.

It may be noticed that the performance ranking between model sizes changes significantly over iterations for SDR, OPS and STOI, and that, in general, larger $K_S$ and smaller $K_N$ seem to involve more iterations to reach the maximum average score. Since the variation of the cost function log-derivative value is independent of the model sizes $K_i$ (FIG. 3), while the scores are strongly $K_i$-dependent (FIGS. 4 and 5), suggests that arbitrary stopping criteria are likely to lead to sub-optimal results, and that no simple $K_i$-independent relationship exists between the optimal iteration number and the cost.

Stopping Criteria

Figure 6:
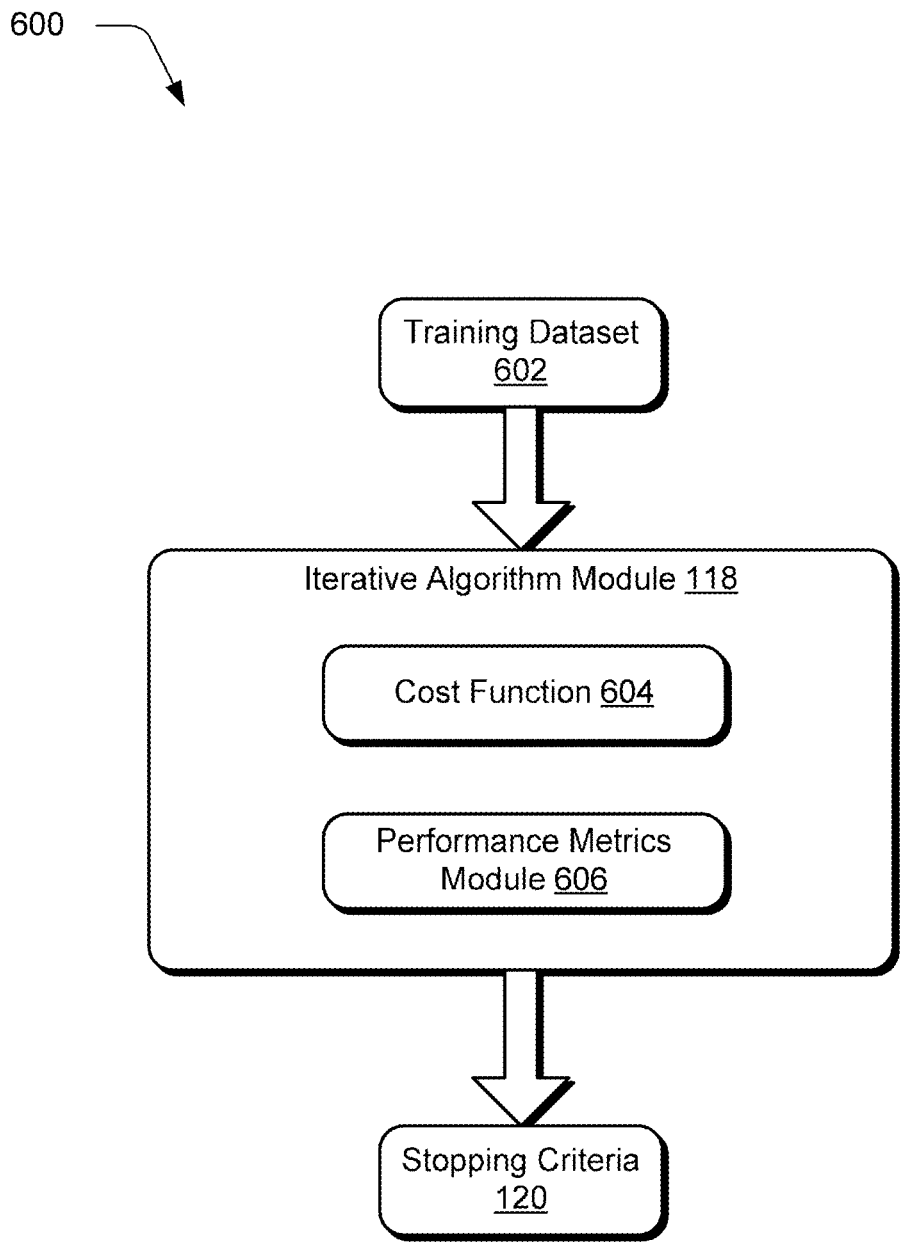
FIG. 6 depicts a system showing an iterative algorithm module of FIG. 1 in greater detail as being configured to identify stopping criteria.

FIG. 6 depicts a system 600 showing the iterative algorithm module 118 in greater detail as being configured to identify stopping criteria 120. Values (e.g., "scores") for performance metrics are not computable in some instances without knowledge of a ground truth, which is not typically available in real world scenarios. Also, considering the non-monotonic relation between the convergence score (e.g., cost) and a score computed using values of performance metrics, the iterative algorithm module 118 may be configured to identify stopping criteria based on a measurable quantity (e.g., either on the number of iterations or the cost function log-derivative value) that maximizes the performance of the algorithm.

As illustrated in FIG. 6, for instance, the iterative algorithm module 118 may be configured to process a training data 602. The processing may include use of a cost function 604 and a performance metrics module 606 that is configured to compute values for the performance metrics for iterations of the algorithm implemented by the iterative algorithm module 118. This may be performed for each iteration, for a different collection (e.g., at different intervals) of the iterations, and so on.

For example, the performance metrics module 606 may be configured to evaluate the performance of two heuristics based on the cost function log-derivative values, and three heuristics based on the number of iterations. To do so, a thirty-fold cross-validation may be performed by the module by using a singled type of noise for each fold (twenty mixtures). One of the folds is taken as an evaluation set and the other 29 folds as development sets.

By construction, the speakers in those two sets are different. For each development set mixture, an iteration number and an associated cost function log-derivative value is computed at which the best performance score is measured based on values of the performance metrics computed by the performance metrics module 606.

An average of the distribution of the following quantities may then be examined by the performance metrics module 606 at these optimal values:
cost function log-derivative value;
logarithm of the cost function log-derivative value;
number of iterations; and
logarithm of the number of iterations.
A fifth stopping criterion may also be considered in which the iteration number corresponding to the maximum average score on the development set is used as stopping criteria 120.

These values are then used as a basis for identifying stopping criteria 120 (e.g., either on the number of iterations or the cost function log-derivative value). These criteria are then used on the samples of the evaluation set (built from the training dataset 602), and the score is recorded that is obtained when the iterative algorithm implemented by the iterative algorithm module 118 is stopped. The average scores for both the supervised and the semi-supervised algorithms and for both the BSS and PEASS overall metrics are then compared to the average true optimal score on each individual mixture.

For the supervised algorithm as shown in the table 700 of FIG. 7, the second, fourth, and fifth heuristics consistently achieve scores close to optimality. By using, for example, the fifth criterion (i.e., iteration number of maximum average score), the performance loss is on average 0.20 dB for the SDR and 1.54% for the OPS compared to optimality. For the semi-supervised algorithm, the fourth and fifth heuristics achieve scores close to optimality. With the fifth criterion, the average performance loss is 0.39 dB for the SDR and 2.21% for the OPS compared to optimality.

The iterative algorithm module 118 may perform a parameter sweep to identify performance metrics and corresponding values to be used as a basis to identify stopping criteria 120, e.g., a number of iterations to be performed for the algorithm. For example, for an NMF based source separation problem, a parameter sweep taking stopping criteria into account may be performed as follows. First, a training dataset 602 is received that corresponds to the sources that are to be separated. The training set, for instance, may be built with isolated segments and an independent development set with synthesized mixtures.

The iterative algorithm module 118 may then perform the iterative algorithm for a number of iterations (e.g., 500) and compute a cost using the cost function 604 and a value for one or more performance metrics of interest using the performance metrics module 606. A computation of cost and metric of interest may be made at each iteration (or once every few iterations), to find an optimal iteration number and its cost for each mixture with each set of $K_i$.

Value associated with the chosen stopping criteria 120 may then be computed. This may be performed in a variety of ways, such as an average of the associated quantity at the optimal iteration for each mixture, as the iteration of maximum average score, and so on. The stopping criteria 120, for instance, may be identified as the iteration with the highest average performance. The stopping criteria may then be used when performing further separation of test samples to refine the stopping criteria 120.

In the case of semi-supervised NMF, as shown in FIG. 5 an arbitrary choice of number of iterations or cost can lead to a suboptimal choice of model sizes if the iteration number is not optimized as well. This algorithm is run on a test data set (600 mixtures) and record the SDR scores at iterations {3; 5; 7; 10; 15; 20; 30; 50; 70; 100; 150; 200; 300; 500}. The best average score is compared at the given iteration number (the 5th criterion) to the average score recorded at a fixed number of 100 iterations, see the table 800 of FIG. 8. From this table 800, it may be noticed that performance at 100 iterations for given model sizes is often much lower than the one at the best number of iterations. Additionally, the best model sizes are different if the iteration number is included as variable, with a gain of 1.3 dB SDR for only 10 iterations. From this results, the model sizes $(K_S;K_N)$ are chosen that are used in the plots in FIGS. 3, 4, 5, and 7 as the best set at 100 iterations (20; 5), the best set overall (20; 150), and two other sets (5; 50) and (50; 30) for demonstration purposes.

In the above discussion, a mismatch has been demonstrated between optimization of the cost function 604 and the optimization of performance metrics in NMF based supervised and semi-supervised source separation algorithms. Empirical stopping criteria 120 are then described that are more closely correlated with the optimal value of the performance metrics of interest, and these criteria are validated with speech denoising experiments. A variety of other examples are also contemplated as further described in the following procedures.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

Figure 9:
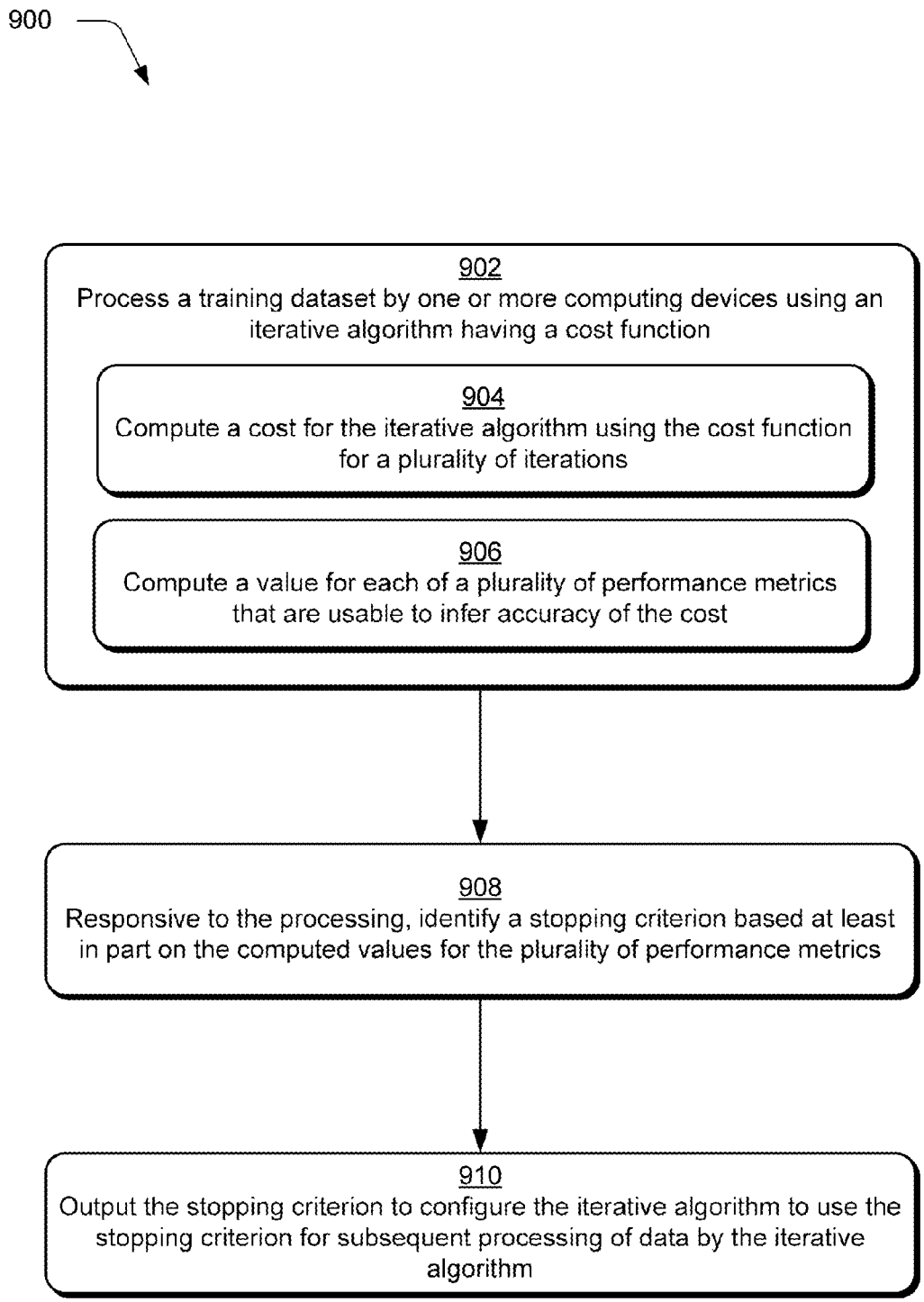
FIG. 9 is a flow diagram depicting a procedure in an example implementation in which one or more stopping criteria are generated based on a training dataset.

FIG. 9 depicts a procedure 900 in an example implementation in which one or more stopping criteria are generated based on a training dataset. A training dataset is processed by one or more computing devices using an iterative algorithm having a cost function (block 902). The processing includes for a plurality of iterations of the iterative algorithm, computing a cost for the iterative algorithm using the cost function (block 904) and computing a value for each of a plurality of performance metrics that are usable to infer accuracy of the iterative algorithm for a respective iteration (block 906), e.g., by the performance metrics module 606.

For example, to find stopping criteria, a training dataset may be utilized that includes a plurality of samples, which involve various situations representative of the scenario of interest for the algorithm. In trying to find a stopping criterion, the algorithm may process each of the samples separately, and for each of them, the cost function and performance metrics may be computed at each iteration or for a plurality of iterations. In this way, a view is obtained of changes regarding the cost and values of the performance metrics, i.e., a performance score.

Responsive to the processing, a stopping criterion is identified based at least in part on the computed values for the plurality of performance metrics (block 908). This may be performed through examination of performance metrics as shown in FIGS. 7 and 8. Continuing with the previous example, for each sample separately, an evolution of a performance score (i.e., the value of the performance metric) is examined. An optimal iteration (with best score) for this single file may be found along with an associated cost (and a cost function log-derivative).

The data may then be aggregated since it is dependent on the samples, e.g., samples may not peak at the same iteration, and with different costs and cost function log-derivatives. A variety of techniques may be used to perform this aggregation. For instance, an aggregate of the different iteration numbers may be computed for each of the samples by taking an average and using it to get the iteration number to be reached before stopping.

In another instance, the different iteration numbers found for each of the samples may be aggregated by taking an average of their logarithmic values (which is equivalent to what is called taking the geometric mean of the iterations) and using it to get the iteration number to be reached before stopping.

In a further instance, the different cost function log-derivatives found for each of the samples may be aggregated by taking their average and using it to get the iteration number to be reached before stopping. It should be noted that this iteration number may not be the same amongst various samples since corresponding cost variations may be different.

In yet another instance, different cost function log-derivatives found for each of the samples may be aggregated by taking the average of a corresponding logarithm and using it to compute the cost function log-derivative value to reach before stopping.

An average of the values of the performance metrics (i.e., the score) for each iteration may then be taken across each of the samples, resulting in a single view (e.g., picture of the evolution) for the average performance score at each iteration or plurality of iterations. The iteration indicated as having the highest accuracy based on the average may then be chosen as a basis for the stopping criterion, e.g., the iteration number itself, a value of the averaged cost function at that iteration, and so on.

Thus, identification of a given stopping iteration can be performed by using the average score for each individual iteration. In that case, the iteration with best average score would be picked. In another instance, identification of a given stopping iteration can be performed by aggregating the optimal stopping iteration for each of the samples, reached where the algorithm performed optimally for said sample. Finally, in another instance, the identification of a given cost function log-derivative value to be reached can be performed by aggregating the cost function log-derivative value obtained for each sample at its optimal iteration (e.g., corresponding to the iteration with best performance score for said sample). Additionally, the single performance scores may be replaced by an aggregate of several performance scores (e.g., average, weighted average, and so on).

The one or more stopping criteria are then output to configure the iterative algorithm to use the stopping criterion for subsequent processing of data by the iterative algorithm (block 910). This may include processing of other data in the training dataset 602 as well as configuration of a module for commercial use, e.g., by one or more client devices to perform processing of user's data.

Figure 10:
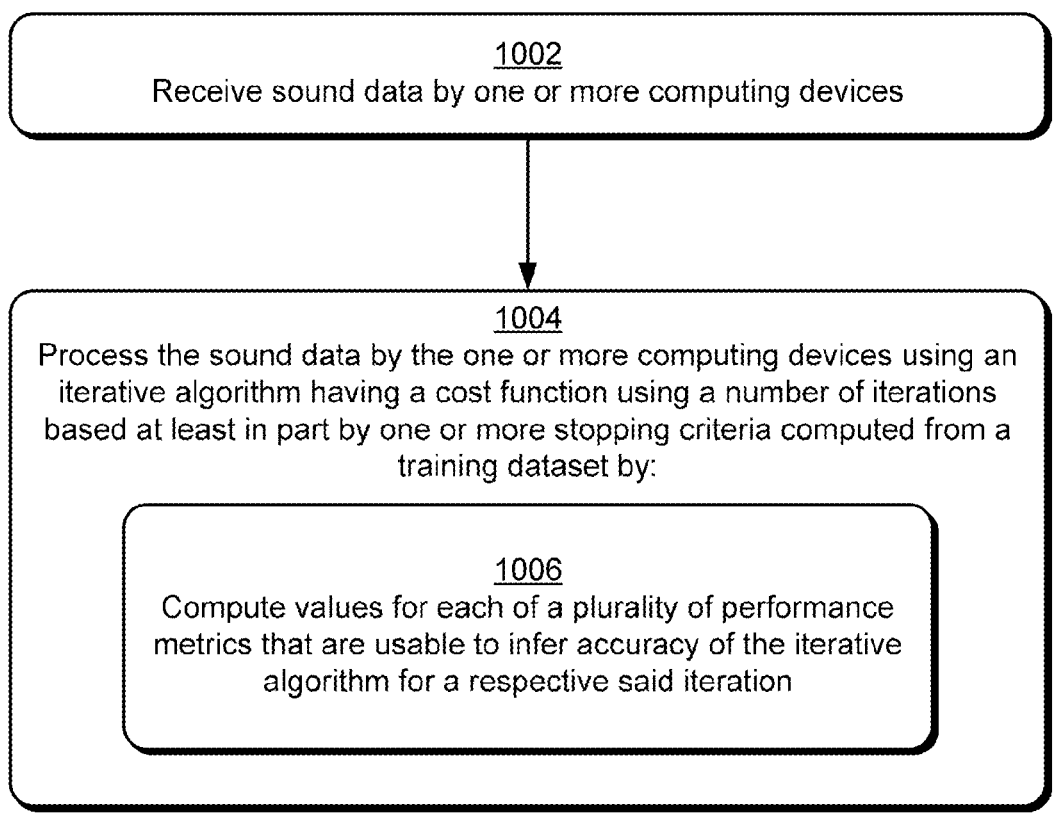
FIG. 10 is a flow diagram depicting a procedure in an example implementation in which stopping criteria are utilized in processing of sound data.

FIG. 10 depicts a procedure 1000 in an example implementation in which stopping criteria are utilized in processing of sound data. Sound data is received by one or more computing devices (block 1002) and processed using an iterative algorithm having a cost function using a number of iterations defined at least in part by one or more stopping criteria (block 1004). A user, for instance, may employ a sound processing module 112 to process sound data 108. The sound processing module 118 may include stopping criteria 120 that are usable to determine when to stop iterations of the algorithm. The stopping criteria 120 may be computed in a variety of ways.

For example, values may be computed for each of a plurality of performance metrics that are usable to infer accuracy of the iterative algorithm for a respective said iteration (block 1006) as previously described in relation to FIG. 6. This may include use of matrixes, averaging of iterations and of cost function log-derivative values identified by individual ones of the performance metrics, and so on. The stopping criteria may also be based on values of a cost at an identified iteration as described above. A variety of other examples are also contemplated as previously described.

Example System and Device

Figure 11:
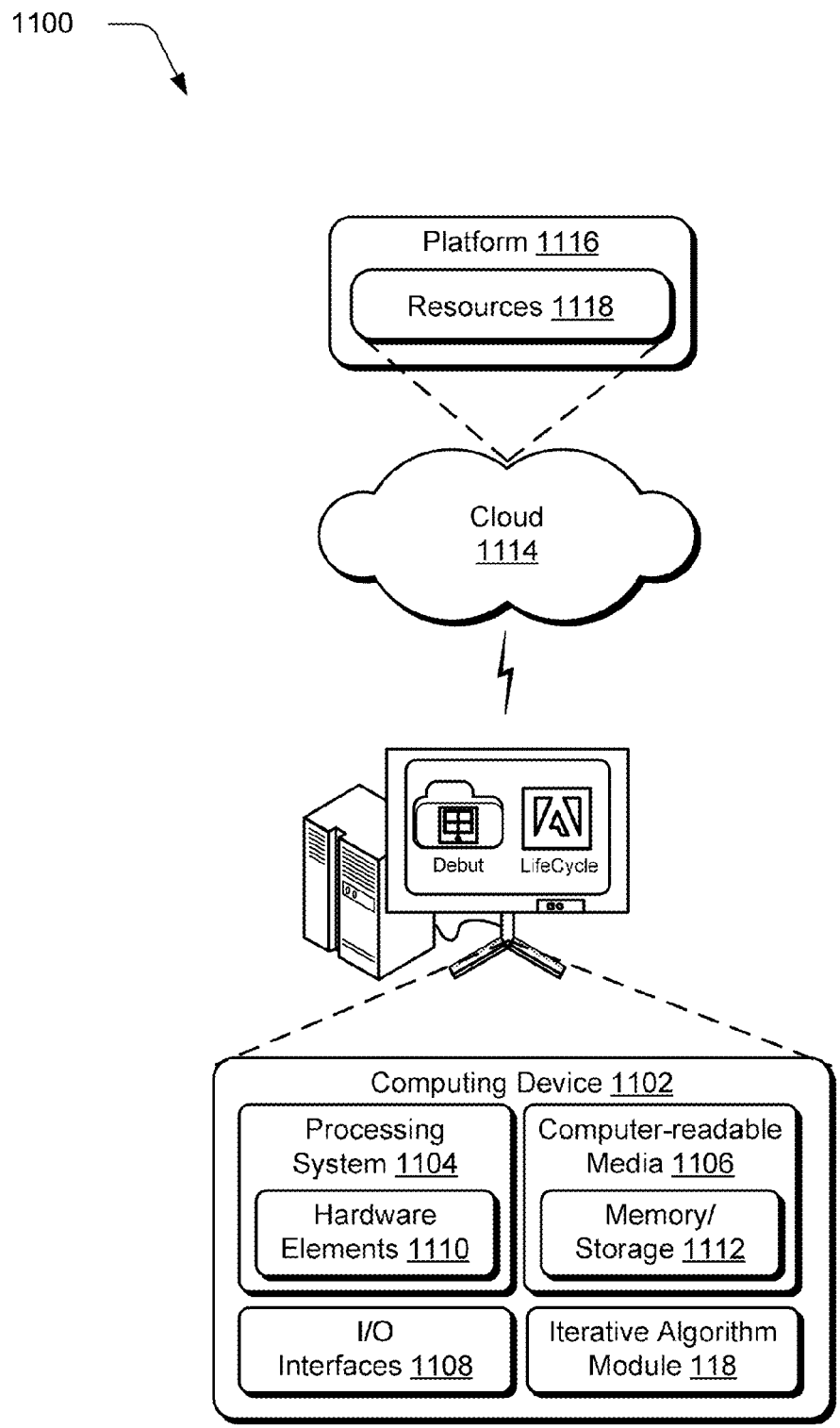
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the iterative algorithm module 118, which may be configured to compute and utilize stopping criteria as part of an iterative algorithm. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a computer environment, a method of identifying a stopping criterion for an iterative algorithm based on more than a cost function, the method comprising:
processing, by at least one computing device, a training dataset using the iterative algorithm having the cost function, the processing including for a plurality of iterations of the iterative algorithm, computing:
a cost for the iterative algorithm using the cost function; and
a value for each of a plurality of performance metrics that are separate and distinct from the cost function and that are usable to infer accuracy of the iterative algorithm for a respective said iteration;
responsive to the processing, identifying, by the at least one computing device, the stopping criterion based at least in part on the computed values for the plurality of performance metrics that are not the cost function; and
outputting, by the at least one computing device, the stopping criterion configure to the iterative algorithm and use the stopping criterion for subsequent processing of data by the iterative algorithm.

2. A method as described in claim 1, wherein the stopping criterion indicates a particular one of the plurality of iterations, at which, the processing of the iterative algorithm is to cease.

3. A method as described in claim 1, wherein the stopping criterion indicates a value calculated from the cost of the iterative algorithm, the value indicating when the processing of the iterative algorithm is to cease.

4. A method as described in claim 3, where in the value calculated from the cost of the iterative algorithm is a cost function log-derivative value.

5. A method as described in claim 1, wherein the identifying of the stopping criterion is performed using an average score for values of the performance metrics for each iteration.

6. A method as described in claim 1, wherein the identifying of the stopping criterion is performed by aggregating an optimal stopping iteration for each sample in the training dataset reached where the iterative algorithm performed optimally for said sample.

7. A method as described in claim 1, wherein the identifying of the stopping criterion is performed through identification of a cost function log-derivative value to be reached by aggregating cost function log-derivative values obtained for each sample in the training dataset at a corresponding optimal iteration.

8. A method as described in claim 1, wherein the iterative algorithm is configured to process sound data to perform sound decomposition, source separation, speaker identification, or noise removal.

9. A method as described in claim 8, wherein the iterative algorithm uses nonnegative matrix factorization (NMF).

10. A method as described in claim 1, wherein values used as a basis for the stopping criterion are based on a cost function log-derivative value or a number of the iterations.

11. A method as described in claim 10, wherein values used as a basis for the stopping criterion are a cost function log-derivative value, logarithm of the cost function log-derivative value, the number of iterations, or a logarithm of the number of iterations.

12. In a computer environment, a method of processing sound data using an iterative algorithm with stopping criteria computed at least in part on a plurality of performance metrics that are not a cost function, the method comprising:
receiving, by at least one computing device, the sound data; and
processing, by the at least one computing device, the sound data based on the stopping criteria to control when to stop processing of the sound data by the iterative algorithm, the iterative algorithm having the cost function using a number of iterations defined at least in part by the stopping criteria, the stopping criteria computed from a training dataset based on values computed for each of the plurality of performance metrics that are separate and distinct from the cost function and the stopping criteria are used to infer accuracy of the iterative algorithm for a corresponding said iteration.

13. A method as described in claim 12, wherein the stopping criterion indicates a particular one of the plurality of iterations, at which, the processing of the iterative algorithm is to cease.

14. A method as described in claim 12, wherein the stopping criterion indicates a value calculated from the cost of the iterative algorithm, the value indicating when the processing of the iterative algorithm is to cease.

15. A method as described in claim 14, where in the value calculated from the cost of the iterative algorithm is a cost function log-derivative value.

16. In a computer environment, a system of identifying a stopping criterion for an iterative algorithm based on more than a cost function, the system comprising:
one or more modules implemented at least partially by a processing system and embodied within a non-transitory computer-readable storage medium, the computer-readable storage medium storing instruction that, responsive to execution by the processing system, causes operations to be performed comprising:

processing a training dataset using the iterative algorithm having the cost function, the processing including for a plurality of iterations of the iterative algorithm, computing:
- a cost for the iterative algorithm using the cost function; and
- a value for each of a plurality of performance metrics that are separate and distinct from the cost function and that are usable to infer accuracy of the iterative algorithm for a respective said iteration;

responsive to the processing, identifying the stopping criterion based at least in part on the computed values for the plurality of performance metrics that are not the cost function; and outputting the stopping criterion to configure the iterative algorithm and use the stopping criterion for subsequent processing of data by the iterative algorithm.

17. A system as described in claim 16, wherein the stopping criterion indicates a particular one of the plurality of iterations, at which, the processing of the iterative algorithm is to cease.

18. A system as described in claim 16, wherein the stopping criterion indicates a value calculated from the cost of the iterative algorithm, the value indicating when the processing of the iterative algorithm is to cease.

19. A system as described in claim 18, where in the value calculated from the cost of the iterative algorithm is a cost function log-derivative value.

20. A system as described in claim 16, wherein the identifying of the stopping criterion is performed using an average score for values of the performance metrics for each iteration.

* * * * *

UNITED STATES PATENT AND TRADEMARK OFFICE
CERTIFICATE OF CORRECTION

PATENT NO. : 9,866,954 B2
APPLICATION NO. : 14/325208
DATED : January 9, 2018
INVENTOR(S) : Germain et al.

It is certified that error appears in the above-identified patent and that said Letters Patent is hereby corrected as shown below:

In the Claims

Column 15, Line 57, delete "criterion configure to the", insert -- criterion to configure the --, therefor.

Signed and Sealed this
Tenth Day of April, 2018

Andrei Iancu
*Director of the United States Patent and Trademark Office*